(12) United States Patent
Wang et al.

(10) Patent No.: US 9,362,734 B2
(45) Date of Patent: Jun. 7, 2016

(54) APPARATUS FOR LIMITING CURRENT OF LINE OR BREAKING CURRENT, AND CONTROL METHOD THEREOF

(71) Applicants: NR ELECTRIC CO., LTD, Nanjing (CN); NR ENGINEERING CO., LTD, Nanjing (CN)

(72) Inventors: Yu Wang, Nanjing (CN); Dongming Cao, Nanjing (CN); Taixun Fang, Nanjing (CN); Hao Yang, Nanjing (CN); Bing Yang, Nanjing (CN); Wei Shi, Nanjing (CN); Wei Lu, Nanjing (CN)

(73) Assignees: NR ELECTRIC CO., LTD, Nanjing (CN); NR ENGINEERING CO., LTD, Nanjing (CN)

(*) Notice: Subject to any disclaimer, the term of this patent is extended or adjusted under 35 U.S.C. 154(b) by 0 days.

(21) Appl. No.: 14/764,575

(22) PCT Filed: Dec. 27, 2013

(86) PCT No.: PCT/CN2013/090615
§ 371 (c)(1),
(2) Date: Jul. 30, 2015

(87) PCT Pub. No.: WO2014/117614
PCT Pub. Date: Aug. 7, 2014

(65) Prior Publication Data
US 2015/0372473 A1 Dec. 24, 2015

(30) Foreign Application Priority Data
Jan. 31, 2013 (CN) .......................... 2013 1 0037531

(51) Int. Cl.
*H02H 9/02* (2006.01)
*H02H 3/08* (2006.01)
(Continued)

(52) U.S. Cl.
CPC ................. *H02H 3/08* (2013.01); *H01H 9/542* (2013.01); *H01H 9/548* (2013.01); *H01H 33/596* (2013.01); *H01H 71/1045* (2013.01); *H02H 9/02* (2013.01); *H01H 2009/0083* (2013.01)

(58) Field of Classification Search
CPC .......... H02H 3/08; H02H 9/02; H01H 9/542; H01H 9/548; H01H 33/596; H01H 71/1045; H01H 2009/0083
See application file for complete search history.

(56) References Cited

U.S. PATENT DOCUMENTS 3,651,374 A * 3/1972 Faust ................... H01H 33/596
218/143
5,164,872 A * 11/1992 Howell .................. H01H 9/548
361/11

(Continued)

FOREIGN PATENT DOCUMENTS

CN 102656656 A 9/2012
CN 102687221 A 9/2012
(Continued)

*Primary Examiner* — Zeev V Kitov
(74) *Attorney, Agent, or Firm* — Gokalp Bayramoglu

(57) ABSTRACT

An apparatus for limiting a current of a line or breaking a current, and a control method thereof are disclosed. The apparatus includes a current breaking branch (29) and a bridge branch. The bridge branch includes two bridge arms formed by four identical current commutation branches. Every two of the four current commutation branches are connected in series, and the formed two bridge arms are then connected in parallel. The two bridge arms are both connected in parallel to the current breaking branch, and middle points of the two bridge arms are separately connected to two ends of a line. Each current commutation branch includes at least one high-speed isolation switch (6) and at least one bidirectional power semiconductor switch (10) that are connected in series. The apparatus can turn off currents in two directions.

8 Claims, 4 Drawing Sheets

(51) Int. Cl.
*H01H 9/54* (2006.01)
*H01H 33/59* (2006.01)
*H01H 71/10* (2006.01)
*H01H 9/00* (2006.01)

(56) References Cited

U.S. PATENT DOCUMENTS 5,517,378 A * 5/1996 Asplund .............. H01H 33/596
361/3

7,508,636 B2 * 3/2009 Sellier .................... H01H 3/222
361/2
2012/0299393 A1 * 11/2012 Hafner ................... H01H 9/542
307/113

FOREIGN PATENT DOCUMENTS

CN 102780200 A 11/2012
CN 202650895 U 1/2013

* cited by examiner

APPARATUS FOR LIMITING CURRENT OF LINE OR BREAKING CURRENT, AND CONTROL METHOD THEREOF

TECHNICAL FILED OF THE INVENTION

The present invention relates to an apparatus for limiting a current of a line or breaking a current of a line, and a method for controlling the apparatus.

BACKGROUND

High-voltage direct current (DC) circuit breaker is one of crucial devices in multi-end. DC power transmission systems. A multi-end high-voltage DC power transmission system has a high voltage level and small line impedance, and once a line short-circuit fault occurs, a DC power transmission network and an alternating current (AC) network will be momentarily affected, therefore, the fault must be cleared quickly. Therefore, a high-voltage DC circuit breaker needs to act as quickly as possible to shorten the duration of the fault or suppress the fault current to the greatest extent, so as to reduce the impacts of the fault on the AC/DC power transmission network. Because the high-voltage DC circuit breaker is connected in series in the power transmission line, the power flow direction in the power transmission line is uncertain, and the current may flow in one of two directions. Therefore, the circuit breaker is required to have the capability of breaking DC currents in two directions.

Chinese Patent Application No. CN102780200A uses a conventional high-voltage DC circuit breaker to break a DC current, where the structure of the conventional high-voltage DC circuit breaker is formed by three parts: an AC circuit breaker, an LC oscillation loop, and a power-consuming element. After the AC circuit breaker is open, an arc is generated. The voltage of the arc oscillates with the LC oscillation loop. When the peak value of the oscillation current reaches the amplitude of the DC current, the DC current can be cancelled completely, so that a zero-crossing point appears at the port of the circuit breaker, which causes the arc to extinguish, thereby achieving an objective of turning off the DC current. Such a breaking method does not include a power semiconductor device, is not directional, and therefore can break currents in two directions, and has a small loss during, normal operation. However, the conventional high-voltage DC circuit breaker requires a long arc-extinguishing time of about a few tens of milliseconds, and cannot meet the requirement for quick fault isolation in the multi-end DC power transmission system.

To quickly isolate of the DC fault current and maintain high power transmission efficiency, Chinese Patent Application No. CN1026877221A discloses an apparatus and method for short-circuiting a current of a power transmission line power distribution line, and a current limiting arrangement, where the apparatus includes a primary circuit breaker, a high-speed switch, an auxiliary circuit breaker, and a non-linear resistance power-consuming element. In a normal operation mode, the current of the line flows through an auxiliary loop, with a small conduction loss; in a fault mode, the current is switched to the primary circuit breaker, and is finally absorbed by the power-consuming element, thereby breaking the current.

After the high-voltage DC breaker apparatus turns off the fault current, the primary circuit breaker bears a voltage of a few hundreds of kilovolts. The number of power semiconductor devices connected in series in one current direction is up to a few hundreds. The power semiconductor device can be conducted in only one direction; therefore, in order to turn off the fault current in both the two current directions, the basic series unit of the primary circuit breaker in the high-voltage DC breaker apparatus adopts two anti-series or anti-parallel structures of power semiconductor devices, and the number of power semiconductor devices in the primary circuit breaker is doubled. When the current is broken in a first current direction, the power semiconductor devices in a second current direction do not have any beneficial effect to break the current or bear the voltage, that is, the utilization rate of the power semiconductor devices of the primary circuit breaker is only 50%. As the costs of the power semiconductor devices account for a large proportion of the total costs of the apparatus, providing the function of breaking currents in two directions will greatly increase the costs of the apparatus. The arrangement of the power semiconductor devices in the second current direction in the primary circuit breaker does not have any beneficial effect, and over-voltage and over-current generated When the current is turned off in the first current direction have adverse effects on the power semiconductor devices in the second current direction. If the power semiconductor devices in the second current direction and the power semiconductor devices in the first current direction are connected in an anti-parallel manner, an over-voltage generated when the current is turned off in the first current direction will be applied to the power semiconductor devices in the second current direction, and the voltage is a reverse voltage for the power semiconductor devices in the second current direction and will cause damage to the devices; if the power semiconductor devices with anti-parallel diodes in the second current direction and the power semiconductor devices with anti-parallel diodes in the first current direction are connected in an anti-series manner, an abruptly increased current generated when the current is turned off in the first current direction will flow through free-wheeling diodes in the power semiconductor devices in the second current direction, reducing the service life of the devices.

The arrangement of the power semiconductor devices in the second current direction also has an adverse effect on the structural design and electrical design of the primary circuit breaker. The arrangement directions of the power semiconductor devices in the first current direction are consistent, making the electrical design and structural design have consistency. The arrangement of the power semiconductor devices in the second current direction destroys the original consistency in the arrangement direction, increasing the difficulty in device layout, installation and wiring.

In the auxiliary circuit breaker branch of Chinese Patent Application No. CN102687221A, the ultra-high-speed mechanical switch is connected in parallel to the primary circuit breaker, the ultra-high-speed mechanical switch cannot completely isolate the apparatus to protect the primary circuit breaker, and the primary circuit breaker does not have obvious breakpoints and is difficult to repair and maintain.

SUMMARY OF THE INVENTION

An objective of the present invention is to provide an apparatus for limiting a current of a line or breaking a current, and a control method thereof, which are suitable for line currents in two directions, and can greatly reduce the costs of the apparatus and reduce the difficulty in device layout, installation and wiring in the apparatus on the premise of ensuring high breaking speed and low loss.

To achieve the above objective, the present invention adopts the following solution:

An apparatus for limiting a current of a line or breaking a current, including: a current breaking branch, the current breaking branch including one breaking unit or at least two breaking units that are connected in series, each breaking unit including one solid-state direct current (DC) circuit breaker and one non-linear resistance connected in parallel; and further including a bridge branch, the bridge branch including two bridge arms formed by four identical current commutation branches, where every two of the four current commutation branches are connected in series, the formed two bridge anus are then connected in parallel, the two bridge anus are both connected in parallel to the current breaking branch, and middle points of the two bridge arms are separately connected to two ends of a line; each current commutation branch includes at least one high-speed isolation switch and at least one bidirectional power semiconductor switch that are connected in series; and a direction in which a current enters from the middle point of a first bridge arm and sequentially flows through a first current commutation branch in the first bridge arm, the current breaking branch, and a fourth current commutation branch in a second bridge arm is defined as a first current direction, a direction in which a current enters from the middle point of the second bridge arm and sequentially flows through a third current commutation branch in the second bridge arm, the current breaking branch, and a second current commutation branch in the first bridge arm is defined as a second current direction, and an arrangement direction of the solid-state DC circuit breaker is the same as the first and second current directions.

The bidirectional power semiconductor switch is formed by two power semiconductor devices connected in reverse parallel, where a second power semiconductor device has turn-oil and turn-off capabilities; and a first power semiconductor device in the first current commutation branch, the second power semiconductor device in the second current commutation branch, the second power semiconductor device in the third current commutation branch, and a first power semiconductor device in the fourth current commutation branch are in the same direction as the first current direction, and the second power semiconductor device in the first current commutation branch, a first power semiconductor device in the second current commutation branch, a first power semiconductor device in the third current commutation branch, and the second power semiconductor device in the fourth current commutation branch are in the same direction as the second current direction.

Each current commutation branch further includes at least one second bidirectional power semiconductor switch, where the second bidirectional power semiconductor switch has a same structure as that of the bidirectional power semiconductor switch and is connected in parallel to the bidirectional power semiconductor switch.

The first power semiconductor device does not have turn-on and turn-off capabilities.

The solid-state DC circuit breaker is formed by at least one power semiconductor device connected in series.

A method for controlling the above apparatus to break a current, the apparatus being connected in series with a current path of a line, characterized in that the solid-state DC circuit breaker in the current breaking branch is closed and the high-speed isolation switches and the bidirectional power semiconductor switches in the current commutation branches are closed, the control method including the following steps:

if an instruction signal of turning off a current of the line is received, determining a direction of the current of the line; and if the direction of the current of the line is the first current direction, performing the following operations in sequence:

turning off the second power semiconductor devices of the bidirectional power semiconductor switches in the second and third current commutation branches at the same time, so as to commutate the current to the current breaking branch;

then, turning off the high-speed isolation switches in the second and third current commutation branches at the same time;

then, turning off the solid-state DC circuit breaker in the current breaking branch at the same time, so as to commutate the current to the non-linear resistance in the current breaking branch; and turning off the high-speed isolation switches in the first and fourth current commutation branches, thus completing the whole breaking process; or if the direction of the current of the line is the second current direction, performing the following operations in sequence:

turning off the second power semiconductor devices of the bidirectional power semiconductor switches in the first and fourth current commutation branches at the same time, so as to commutate the current to the current breaking branch;

then, turning off the high-speed isolation switches in the first and fourth current commutation branches at the same time;

then, turning off the solid-state DC circuit breaker in the current breaking branch at the same time, so as to commutate the current to the non-linear resistance in the current breaking branch; and turning off the high-speed isolation switches in the second and third current commutation branches, thus completing the whole breaking process.

A method for controlling the above apparatus to limit a current, the apparatus being connected in series with a current path of a line, characterized in that the solid-state DC circuit breaker in the current breaking branch is closed and the high-speed isolation switch and the bidirectional power semiconductor switch in the current commutation branch are closed, the method including the following steps:

if an instruction signal of limiting a current of the line is received, determining a direction of the current of the line; and if the direction of the current of the line is the first current direction, performing the following operations in sequence:

turning off the second power semiconductor devices of the bidirectional power semiconductor switches in the second and third current commutation branches at the same time, so as to commutate the current to the current breaking branch;

then, turning off the high-speed isolation switches in the second and third current commutation branches at the same time; and then, turning off the at least one solid-state DC circuit breaker in the current breaking branch, so as to commutate the current to the at least one non-linear resistance in the current breaking branch; or if the direction of the current of the line is the second current direction, performing the following operations in sequence:

turning off the second power semiconductor devices of the bidirectional power semiconductor switches in the first and fourth current commutation branches at the same time, so as to commutate the current to the current breaking branch;

then, turning off the high-speed isolation switches in the first and fourth current commutation branches at the same time; and then, turning off the at least one solid-state DC circuit breaker in the current breaking branch, so as to commutate the current to the at least one non-linear resistance in the current breaking branch, thereby limiting the current of the line.

By means of the above solution, the present invention is advantageous in the following aspects:

Low conduction loss: When the line works normally, the current commutation branch can bypass the current breaking branch, and the current of the line flows through the current commutation branches formed by high-speed isolation switches with almost zero impedance and a small number of power semiconductor devices with a low conduction voltage drop. Because the current breaking branch requires a higher conduction voltage drop, almost no current flows through the current breaking branch, and therefore, the total loss of the apparatus is quite low.

Compared with the conventional high-voltage DC circuit breaker, the breaking speed is increased. The power semiconductor device that is used as a unit to implement current breaking has a high speed. Generally, the breaking speed of the power semiconductor device is only a few tens of milliseconds and can be ignored. The total breaking time of the apparatus is mainly determined by the breaking time of the high-speed isolation switch. Currently, the breaking time of the high-speed isolation switch can reach 1-3 ms. Therefore, it can be predicted that the total breaking time of the apparatus is about 3-5 ms, which is must faster than the breaking speed of the conventional high-voltage DC circuit breaker.

Breaking of currents in two directions is achieved at low costs. The current breaking branch in the present invention is formed by power switch devices connected in series in a same current direction, and the current commutation branch causes currents of the line that are in two directions to flow through the current breaking branch in a same direction. When the current of the line is in the first current direction, the power semiconductor devices (7) in the current commutation branches (A, D) are in the same direction as the first current direction, the power semiconductor devices (8) in the current commutation branches (B, C) are turned off, so that the power semiconductor devices (7) in the current commutation branches (A, D) are in a direction reverse to the first current direction, and are in a reverse cut-off state, and the direction of the current flowing through. the current breaking branch is from a node (1) to a node (2). When the current of the line is in the second current direction, the current commutation branches (B, C) are in the same direction as the second current direction, and the power semiconductor devices (8) in the current commutation branches (A, D) are turned off, so that the power semiconductor devices (7) in the current commutation branches (A, D) are in a direction reverse to the second current direction, and are in a reverse cut-off state, and the direction of the current flowing through the current breaking branch is from the node (1) to the node (2). It can be seen that when the currents of the line have different directions, the currents flow through the current breaking branch in the same direction. The current commutation branch includes a small number of power semiconductor devices and four groups of high-speed isolation switches. Because the number of power semiconductor devices is small, the costs are low. The high-speed isolation switches are open when there is not current, there is no need to extinguish an arc, and only the function of isolating the voltage is provided, so that the costs are low.

Therefore, compared with Chinese Patent Application No. CN102687221A, the total costs are greatly reduced, and the utilization efficiency of power semiconductor devices in the apparatus is improved; in addition, the defect of Chinese Patent Application No. CN102687221A in implementing the bidirectional function is avoided.

Good isolation and maintenance function: The high-speed isolation switches in the current commutation branches in the present invention are open after the current is broken, so that all the power semiconductor devices in the apparatus are completely isolated, which is safe and reliable and facilitates repair and maintenance, and no additional isolation knife switch needs to be configured for the apparatus, so that the costs are saved.

DETAILED DESCRIPTION OF THE INVENTION

Figure 1:
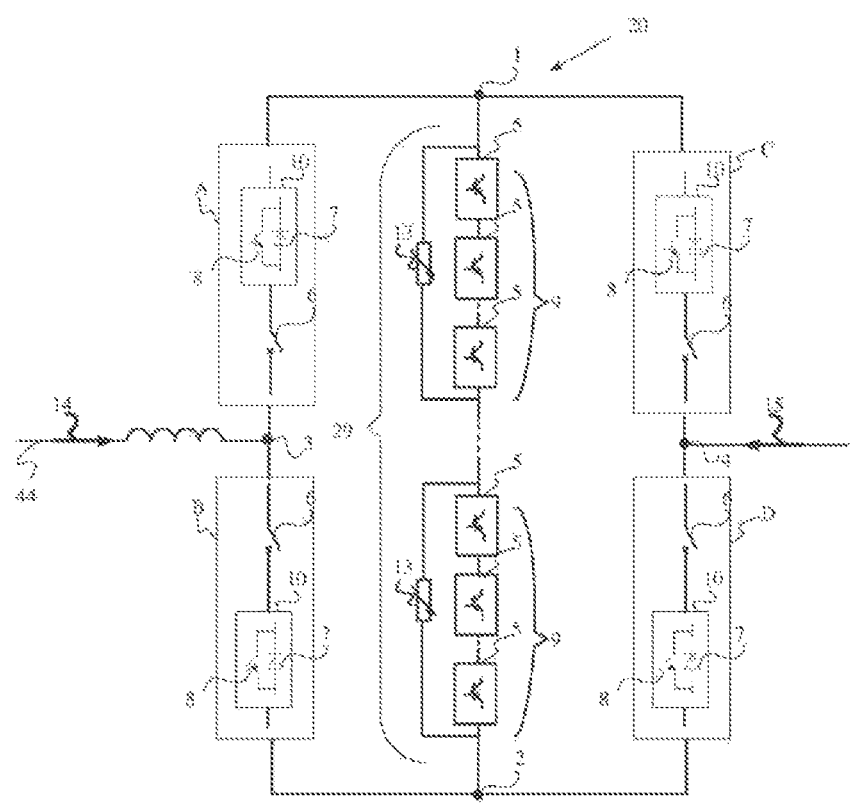
FIG. 1 is a schematic view illustrating the connection of an apparatus according to the present invention.

As shown in FIG. 1, an apparatus 20 for limiting a current of a line 44 or breaking a current according to the present invention includes a current breaking branch 29 and a bridge branch, which will be described below respectively.

The current breaking branch 29 includes at least one breaking unit connected in series, and two ends of the current breaking branch 29 are a node 1 and a node 2 respectively. Each breaking unit includes one solid-state DC circuit breaker 9 and one non-linear resistance 13 connected in parallel, the solid-state DC circuit breaker 9 is formed by at least one power semiconductor device 5 connected in series, and an arrangement direction of the solid-state DC circuit breaker 9 is the same as a current direction from the node 1 to the node 2.

The bridge branch includes two bridge anus formed by four identical current commutation branches A, B, C, and D, where a specific relationship of connection is that: the current commutation branches A and B are connected in series to form a first bridge arm, the middle point 3 of the bridge arm being connected to one end of the line 44; the current commutation branches C and D are connected in series to form a second bridge arm, the middle point 4 of the bridge arm being connected to the other end of the line 44; and the two bridge arms are then connected in parallel, and the two bridge arms are both connected in parallel to the current breaking branch 29.

Figure 2:
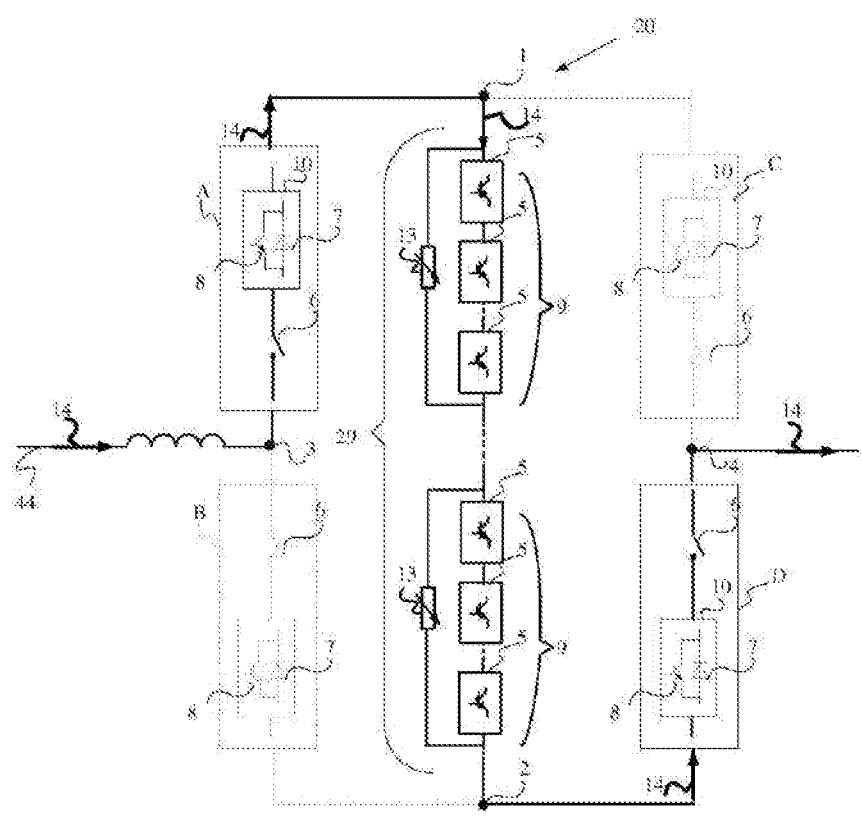
FIG. 2 illustrates a correspondence between the first current direction and the direction of the power semiconductor device.
Figure 3:
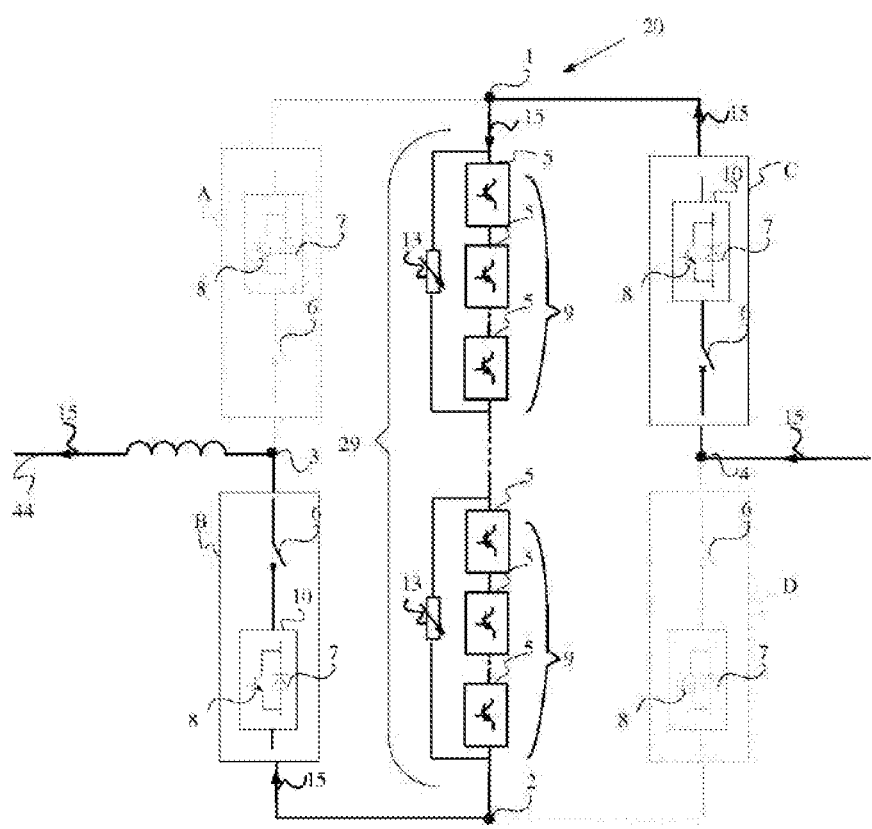
FIG. 3 illustrates a correspondence between the second current direction and the direction of the power semiconductor device.

Each current commutation branch includes at least one high-speed isolation switch 6 and at least one bidirectional power semiconductor switch 10 that are connected in series. The bidirectional power semiconductor switches 10 in the current commutation branches A and D each include a power semiconductor device 7 in a first current direction 14 and a power semiconductor device 8 in a second current direction 15 that are connected in parallel, a correspondence between the current direction and the direction of the power semiconductor device is shown in FIG. 2, and the power semiconductor device 8 has turn-on and turn-off capabilities. The bidirectional power semiconductor switches 10 in the current commutation branches B and C each include a power semiconductor device 7 in the second current direction 15 and a power semiconductor device 8 in the first current direction 14 that are connected in parallel, a correspondence between the current direction and the direction of the power semiconductor device is shown in FIG. 3, and the power semiconductor device 8 has turn-on and turn-off capabilities.

In practice, the current commutation branches A, B, C, and D each may further include at least one bidirectional power semiconductor switch 10, which is connected in parallel to the bidirectional power semiconductor switches 10 in the foregoing current commutation branches A, B, C, and D. By setting such a structure with multiple branches connected in parallel, the current bearing capability of the apparatus 20 can be increased.

Each current commutation branch has a smaller on resistance than that of the current breaking branch 29. The term "on resistance" refers to a resistance to a current flowing through a conducted power semiconductor device. In other words, the current commutation branch has a lower conduction voltage drop than that of the current breaking branch 29.

In the apparatus 20, the current breaking branch 29 has a higher voltage blocking capability than that of the current commutation branch, and the current breaking branch 29 is capable of breaking a unidirectional current of line. Because a high breaking voltage is generated between the two ends of the current breaking branch 29, that is, between the node 1 and the node 2 after the current is broken, for example, a high voltage of hundreds to thousands of volts can be generated in a high-voltage DC power transmission system, the current breaking branch 29 includes many power semiconductor devices 5 connected in series, which work at the same time to evenly bear the breaking voltage. Therefore, the current breaking branch 29 has a higher voltage blocking capability than that of the current commutation branch.

Figure 4:
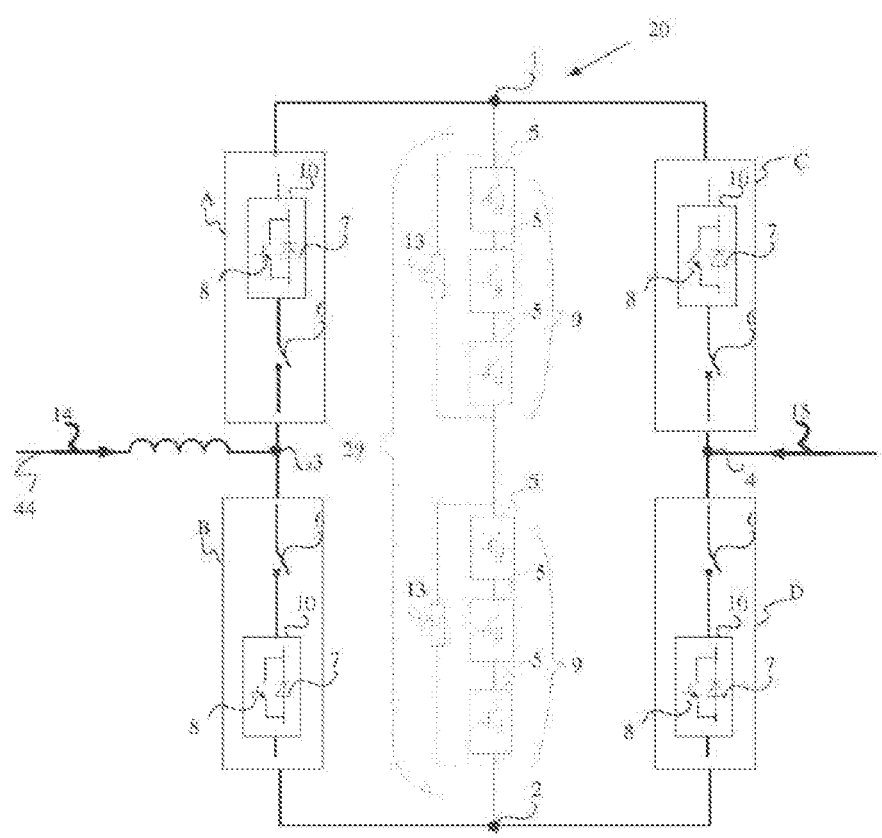
FIG. 4 illustrates a current commutation branch in a normal mode.

In the present invention, each of the current commutation branches A, B, C, and D has two operation modes, including a normal mode and a breaking mode. In the normal mode, that is, during normal operation of the system, a normal current of the line flows through the apparatus 20; in this case, the power semiconductor devices 8 of the current commutation branches A, B, C, and D can be controlled to enter an on state, and the normal current of the line flows through the current commutation branches A, B, C, and D. As shown in FIG. 4, a normal current of the line flows through the current commutation branches A and C and the current commutation branch B and D, and because the current commutation branches A, B, C, and D have a lower conduction voltage drop than that of the current breaking branch 29, the current breaking branch 29 is bypassed, almost no current flows through the current breaking branch 29, the current commutation branches A and C and the current commutation branches B and D evenly bear the current of the line, and currents in two directions can both flow. When the current of the line is in the first current direction 14, part of the current flows through the power semiconductor device 7 of the current commutation branch A and the power semiconductor device S of the current commutation branch C, and the other part of the current flows through the power semiconductor device 8 of the current commutation branch B and the power semiconductor device 7 of the current commutation branch D; when the current of the line is in the second current direction 15, part of the current flows through the power semiconductor device 8 of the current commutation branch A and the power semiconductor device 7 of the current commutation branch C, and the other part of the current flows through the power semiconductor device 7 of the current commutation branch B and the power semiconductor device 8 of the current commutation branch D. Because the current commutation branch can be implemented by using a small number of devices and has a small on resistance, the apparatus 20 connected to the line 44 generates a small additional loss.

In the breaking mode, the power semiconductor devices 8 in the current commutation branches A, B, C, and D can be selectively turned off according to the direction of the current of the line 11. After the power semiconductor device 8 is turned off, the bidirectional power semiconductor switch 10 becomes a power semiconductor device that only has a unidirectional conduction capability. By means of the unidirectional conduction property of the power semiconductor device, currents of the line that have two directions flow through the current breaking branch 29 in a same direction. In this way, the power semiconductor devices 5 in the current breaking branch 29 can have only one arrangement direction, and the number of power semiconductor devices is halved. The main function of the high-speed isolation switches 6 is to isolate the voltage. A high breaking voltage is generated between the node 1 and the node 2 after the current breaking branch 29 breaks the current, the voltage is applied to the current commutation branches, the high-speed isolation switches 6 can bear a high breaking voltage, and the power semiconductor devices in the current commutation branches only need to bear a small breaking voltage.

To sum up, during normal operation, the current commutation branches can bypass the current breaking branch 29, so as to reduce the operation loss of the apparatus 20; when the current needs to be turned off, the current commutation branches provide a current commutation function to transfer a current that is in one direction to the current breaking branch 29; the switching can be implemented by simply controlling on and off of the power semiconductor devices 8, and does not require additional hardware costs.

The present invention also provides a method for controlling the apparatus 20 to break a current, the apparatus 20 being connected in series with a current path of a line 44, where the solid-state DC circuit breaker 9 in the current breaking branch 29 is closed and the high-speed isolation switches 6 and the bidirectional power semiconductor switches 10 in the current commutation branches A, B, C, and D are closed, the control method including the following steps:

if an instruction signal of turning off a current of the line 44 is received, determining a direction of the current of the line 44; and if the direction of the current of the line is the first current direction 14, performing the following operations in sequence:

turning off the second power semiconductor devices 8 of the bidirectional power semiconductor switches 10 in the current commutation branches B and C at the same time, so as to commutate the current to the current breaking branch 29;

then, turning off the high-speed isolation switches 6 in the current commutation branches B and C at the same time, where when the direction of the current of the line is the first current direction 14, as shown in FIG. 2, the current commutation branches B and C bear a high breaking voltage generated when the current breaking branch 29 breaks the current, and therefore, before the current breaking branch 29 breaks the current, the high-speed isolation switches 6 of the current commutation branches B and C must be separated to prevent the power semiconductor devices of the branches from being damaged due to the high breaking voltage; and the current commutation branches A and D are connected in series with the current breaking branch 29, has a breaking current flowing therethrough but does not bear the high breaking voltage, and should be kept in a closed state;

then, turning off the solid-state DC circuit breaker 9 in the current breaking branch 29 at the same time so as to commutate the current to the non-linear resistance 13 in the current breaking branch 29; and turning off the high-speed isolation switches 6 in the current commutation branches A and D, thus completing the whole breaking process; or if the direction 4 the current of the line is the second current direction 15, performing the following operations in sequence:

turning of the second power semiconductor devices 8 of the bidirectional power semiconductor switches 10 in the current commutation branches A and D at the same time, so as to commutate the current to the current breaking branch 29;

then, turning off the high-speed isolation switches 6 in the current commutation branches A and D at the same time, where when the direction of the current of the line is the second current direction 15, as shown in FIG. 3, the current commutation branches A and D bear a high breaking voltage generated when the current breaking branch 29 breaks the current, and therefore, before the current breaking branch 29 breaks the current, the high-speed isolation switches 6 of the current commutation branches A and D must be separated to prevent the power semiconductor devices of the branches from being damaged due to the high breaking voltage; and the current commutation branches B and C are connected in series with the current breaking branch 29, has a breaking current flowing therethrough but does not bear the high breaking voltage, and should be kept in a closed state;

then, turning of the solid-state DC circuit breaker 9 in the current breaking branch 29 at the same time, so as to commutate the current to the non-linear resistance 13 in the current breaking branch 29; and turning of the high-speed isolation switches 6 in the current commutation branches B and C, thus completing the whole breaking process.

The present invention also provides a method for controlling the apparatus 20 to limit a current in a line 44, the apparatus 20 being connected in series with a current path of the line 44, where the solid-state DC circuit breaker 9 in the current breaking branch 29 is closed and the high-speed isolation switches 6 and the bidirectional power semiconductor switches 10 in the current commutation branches A, B, C, and D are closed, the control method including the following steps:

if an instruction signal of limiting the current of the line 44 is received, determining a direction of the current of the line 44, and if the direction of the current of the line is the first current direction 14, performing the following operations in sequence:

turning off the second power semiconductor devices 8 of the bidirectional power semiconductor switches 10 in the current commutation branches B and C at the same time, so as to commutate the current to the current breaking branch 29;

then, turning off the high-speed isolation switches 6 in the current computation branches B and C at the same time; and then, turning off a particular number of solid-state DC circuit breakers 9 (at least one solid-state DC circuit breaker 9) in the current breaking branch 29, so as to commutate the current to a particular number of non-linear resistances 13 (at least one non-linear resistance 13) in the current breaking branch 29; or if the direction of the current of the line is the second current direction 15, performing the following operations in sequence:

turning off the second power semiconductor devices 8 of the bidirectional power semiconductor switches 10 in the current commutation branches A and D at the same time, so as to commutate the current to the current breaking branch 29;

then, turning off the high-speed isolation switches 6 in the current commutation branches A and D at the same time; and then, turning off a particular number of solid-state DC circuit breakers 9 (at least one solid-state DC circuit breaker 9) in the current breaking branch 29, so as to commutate the current to a particular number of non-linear resistances 13 (at least one non-linear resistance 13) in the current breaking branch 29, thereby limiting the current of the line 44.

The particular number is determined by an initial current value and a target limit value.

A specific implementation of the apparatus of the present invention is described through an embodiment:

The apparatus 20 is designed to be capable of limiting or breaking currents in two directions of a ±200 kV high-voltage DC power transmission line 44, with a current breaking capability of 2 kA, and having a current limiting capability.

As shown in FIG. 1, the apparatus 20 includes a current breaking branch 29 and current commutation branches A, B, C, and D. The current breaking branch 29 includes two structures each formed by one solid-state DC circuit breaker 9 and one non-linear resistance 13 that are connected in parallel, where the solid-state DC circuit breaker 9 includes at least one power semiconductor device 5 in one direction. In this embodiment, the current breaking branch 29 should be capable of bearing a breaking voltage of at least 400 kV, and considering a certain margin, is designed to break 600 kV two 4.5 kV/1.6 kA IGBTs are connected in parallel to serve as a unit device, and considering non-uniform voltages that may occur at the moment of turn-off, a certain margin needs to be set for the voltage resistance design of the devices; a total of 200 unit devices need to be connected in series, which are divided into two groups, each solid-state DC circuit breaker 9 includes 100 unit devices connected in series and all the IGBTs have the same arrangement direction.

The apparatus 20 further includes current commutation branches A, B, C, and D, where the current commutation branches A and B form a first bridge arm whose middle point 3 is connected to one end of the line 44, and the current computation branches C and D form a second bridge arm whose middle point 4 is connected to the other end of the line 44, and the two bridge arms are both connected in parallel to the current breaking branch 29.

The apparatus 20 requires a total of four current commutation branches, each branch having same devices. Each branch includes at least one bidirectional power semiconductor switch 10 and at least one high-speed isolation switch 6, and the high-speed isolation switch 6 is required to be capable of bearing a breaking voltage of 600 kV and provide quick action.

The bidirectional power semiconductor switch 10 is formed by an IGBT unit with an anti-parallel diode. The bidirectional power semiconductor switch 10 only needs to bear a very small breaking voltage. A 4.5 kV/1.6 kA IGBT unit with an anti-parallel diode may be used to form one bidirectional power semiconductor switch 10, and a total of three bidirectional power semiconductor switches 10 are required, and the arrangement directions of the devices are shown in FIG. 2 and FIG. 3.

The above embodiments are used to describe the technical solutions of the present invention only, and are not intended to limit the present invention. After reading this application, those skilled in the art may make various variations or modifications to the present invention based on the above embodiments, but all such variations or modifications fall within the protection scope of the present invention as defined by the claims.

What is claimed is:

1. An apparatus for limiting a current of a line or breaking a current, comprising:
   a current breaking branch, wherein the current breaking branch comprises one breaking unit or at least two breaking units that are connected in series, each breaking unit comprises one solid-state direct current (DC) circuit breaker and one non-linear resistance connected in parallel,
   a bridge branch, wherein the bridge branch comprises two bridge arms formed by four identical current commutation branches, every two of the four current commutation branches are connected in series, the formed two bridge arms are then connected in parallel, the two bridge arms are both connected in parallel to the current breaking branch, and middle points of the two bridge arms are separately connected to two ends of a line; each current commutation branch comprises at least one high-speed isolation switch and at least one bidirectional power semiconductor switch that are connected in series; and a direction in which a current enters from the middle point of a first bridge arm and sequentially flows through a first current commutation branch in the first bridge arm, the current breaking branch, and a fourth current commutation branch in a second bridge arm is defined as a first current direction, a direction in which a current enters from the middle point of the second bridge arm and sequentially flows through a third current commutation branch in the second bridge arm, the current breaking branch, and a second current commutation branch in the first bridge arm is defined as a second current direction, and an arrangement direction of the solid-state DC circuit breaker is the same as the first and second current directions.

2. The apparatus for limiting a current of a line or breaking a current according to claim 1, wherein the bidirectional power semiconductor switch is formed by two power semiconductor devices connected in reverse parallel, a second power semiconductor device has turn-on and turn-off capabilities, and a first power semiconductor device in the first current commutation branch, the second power semiconductor device in the second current commutation branch, the second power semiconductor device in the third current commutation branch and a first power semiconductor device in the fourth current commutation branch are in the same direction as the first current direction, and the second power semiconductor device in the first current commutation branch, a first power semiconductor device in the second current commutation branch, a first power semiconductor device in the third current commutation branch, and the second power semiconductor device in the fourth current commutation branch are in the same direction as the second current direction.

3. The apparatus for limiting a current of a line or breaking a current according to claim 2, wherein each current commutation branch further comprises at least one second bidirectional power semiconductor switch, the second bidirectional power semiconductor switch has a same structure as that of the bidirectional power semiconductor switch and is connected in parallel to the bidirectional power semiconductor switch.

4. The apparatus for limiting a current of a line or breaking a current according to claim 2, wherein the first power semiconductor device does not have turn-on and turn-off capabilities.

5. The apparatus for limiting a current of a line or breaking a current according to claim 1, wherein the solid-state DC circuit breaker is formed by at least one power semiconductor device connected in series.

6. A method for controlling the apparatus according to claim 2 to break a current, wherein the apparatus is connected in series with a current path of a line, the solid-state DC circuit breaker in the current breaking branch is closed and the high-speed isolation switch and the bidirectional power semiconductor switch in the current commutation branch are closed, and the control method comprising the following steps:
   receiving an instruction signal of turning off a current of the line;
   determining a direction of the current of the line;
   performing the following operations in sequence, if the direction of the current of the line is the first current direction;
   turning off the second power semiconductor devices of the bidirectional power semiconductor switches in the second and third current commutation branches at the same time, so as to commutate the current to the current breaking branch, then, turning off the high-speed isolation switches in the second and third current commutation branches at the same time, then, turning off the solid-state DC circuit breaker in the current breaking branch at the same time, so as to commutate the current to the non-linear resistance in the current breaking branch: and turning off the high-speed isolation switches in the first and fourth current commutation branches, thus completing the whole breaking process; or
   performing the following operations in sequence, if the direction of the current of the line is the second current direction;
   turning off the second power semiconductor devices of the bidirectional power semiconductor switches in the first and fourth current commutation branches at the same time, so as to commutate the current to the current breaking branch, then, turning off the high-speed isolation switches in the first and fourth current commutation branches at the same time, then, turning off the solid-state DC circuit breaker in the current breaking branch at the same time, so as to commutate the current to the non-linear resistance in the current breaking branch, and turning off the high-speed isolation switches in the second and third current commutation branches, thus completing the whole breaking process.

7. A method for controlling the apparatus according to claim 2 to limit a current, wherein the apparatus is connected in series with a current path of a line, the solid-state DC circuit breaker in the current breaking branch is closed and the high-speed isolation switches and the bidirectional power semiconductor switches in the current commutation branches are closed, and the method comprising the following steps:

receiving an instruction signal of limiting a current of the line;

determining a direction of the current of the line;

performing the following operations in sequence if the direction of the current of the line is the first current direction:

turning off the second power semiconductor devices of the bidirectional power semiconductor switches in the second and third current commutation branches at the same time, so as to commutate the current to the current breaking branch, then, turning off the high-speed isolation switches in the second and third current commutation branches at the same time, and then, turning off the at least one solid-state DC circuit breaker in the current breaking branch, so as to commutate the current to the at least one non-linear resistance in the current breaking branch; or performing the following operations in sequence if the direction of the current of the line is the second current direction:

turning off the second power semiconductor devices of the bidirectional power semiconductor switches in the first and fourth current commutation branches at the same time, so as to commutate the current to the current breaking branch, then, turning off the high-speed isolation switches in the first and fourth current commutation branches at the same time, then, turning off the at least one solid-state DC circuit breaker in the current breaking branch, so as to commutate the current to the at least one non-linear resistance in the current breaking branch, thereby limiting the current of the line.

8. The apparatus for limiting a current of a line or breaking a current according to claim 2, wherein the solid-state DC circuit breaker is formed by at least one power semiconductor device connected in series.

* * * * *